No. 633,750. Patented Sept. 26, 1899.
A. J. AUCOIN.
CLOD CRUSHER.
(Application filed June 22, 1899.)
(No Model.)
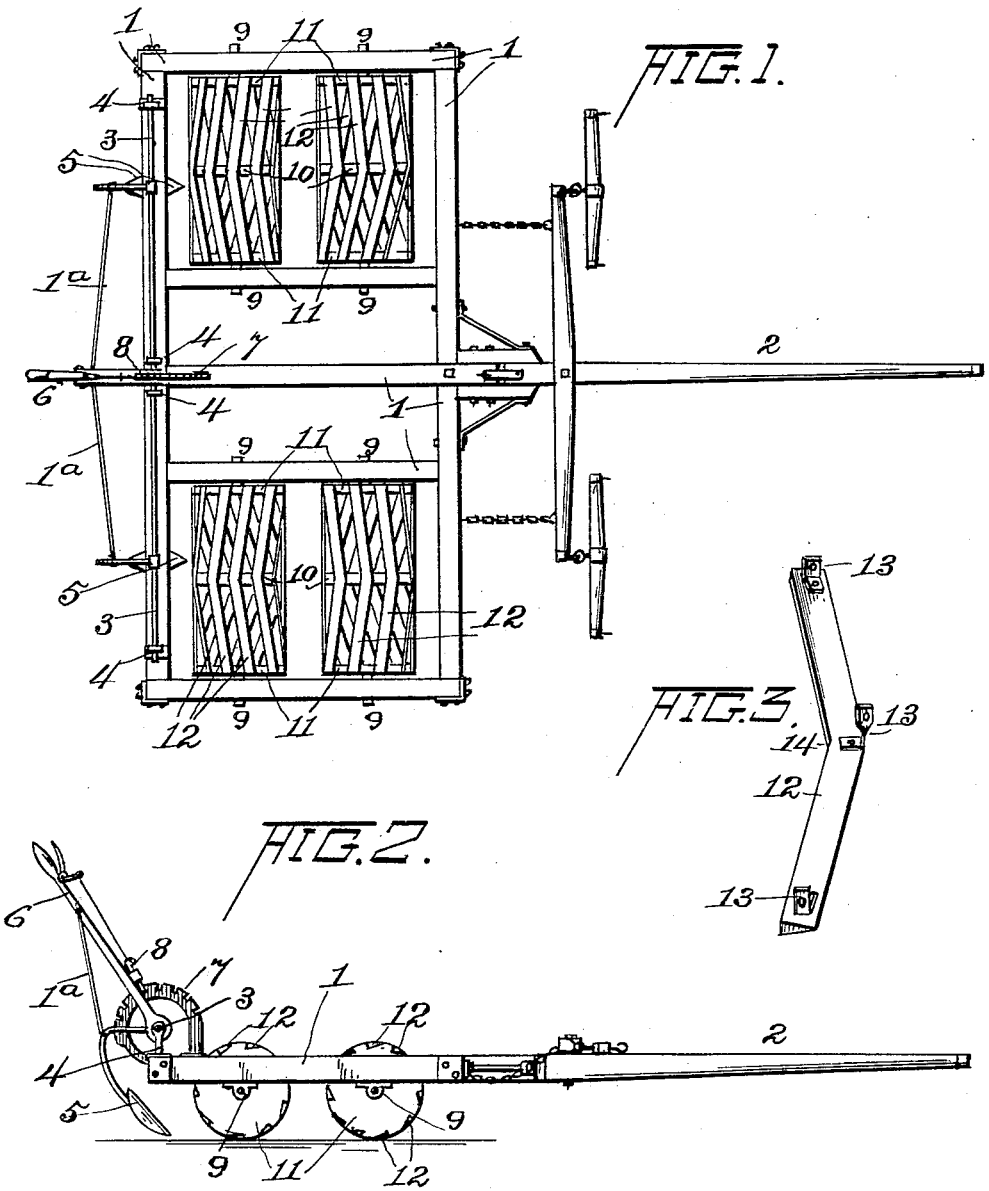

UNITED STATES PATENT OFFICE.

ARTHUR J. AUCOIN, OF THIBODEAUX, LOUISIANA.

CLOD-CRUSHER.

SPECIFICATION forming part of Letters Patent No. 633,750, dated September 26, 1899.

Application filed June 22, 1899. Serial No. 721,449. (No model.)

*To all whom it may concern:*

Be it known that I, ARTHUR J. AUCOIN, a citizen of the United States, residing at Thibodeaux, in the parish of Lafourche and State of Louisiana, have invented certain new and useful Improvements in Clod-Crushers, of which the following is a specification.

This invention relates to clod-crushers, and particularly to an improved crushing and pulverizing roller.

The object of the invention is to provide a clod crushing and pulverizing roller for farm and similar uses of novel and peculiar construction.

The invention consists in the novel construction and arrangement of parts, and resides, essentially, in a roller composed of longitudinal bent crushing-blades whose ends stand out of the radial transverse plane of their central portion, so as to make an angular longitudinal impression.

In the accompanying drawings, forming part of this application, Figure 1 is a top view of my crushing-machine. Fig. 2 is a side elevation. Fig. 3 is a detail perspective view of one of the crushing-blades.

The same numeral-references denote the same parts throughout the drawings.

The frame 1 has the usual tongue 2 and draft attachments for two horses, though in small machines draft attachments for one horse may be used. A longitudinal shaft 3 is journaled in brackets 4, secured to the rear portion of the frame 1, and to this shaft two or more plow-points or cultivators 5 are secured. The plows are connected together by bars 1ª and to a hand-lever 6, whereby the plows are raised and lowered as desired, they being controlled by a ratchet 7 and pawl 8.

The crushing and pulverizing rollers are journaled at 9 in the frame 1, and they are composed of (only one roller being here described) a central disk 10 and end disks 11 and crushing-blades 12, having plates 13 for securing the blades to the periphery of the disks 10 and 11.

The blades 12 have a central bend 14 in their longitudinal length, so that the ends of the blades stand out of the radial transverse plane of the center of the blades. The blades are secured upon the disks to complete one roller, with the bend 14 of all the blades of this one roller lying in the same direction or pointing one after the other in one and the same direction, and, for example, this will be called one of the "front" rollers, although it may be a rear roller; but the roller which follows in the path of the front roller has the blade-bends pointing in the opposite direction to that of the front or first-described roller, whereby an angular or diamond-shaped impression is made on the earth, which is thereby completely crushed and pulverized, leaving the soil in perfect condition for cultivation or for the action of the plows 5, which may be either furrow openers or coverers.

Should it be desired to leave the earth smooth, a solid roller may be substituted for the rear rollers.

I do not wish to be understood as limiting myself to any particular size or material in the construction of the rollers, nor to any special angle of the blades or number thereof; but I desire to reserve to myself the right to make such changes therein as may produce the best results in the practical application of the machine without departing from the spirit of my invention.

Having thus described my invention, what I claim as new, and desire to secure by Letters Patent, is—

1. A clod-crushing roller having a series of crushing-blades, the center of each blade being bent out of the radial transverse plane of the blade ends.

2. A clod crushing and pulverizing roller comprising a series of centrally-bent blades, and disks to which the blades are secured, with their bends pointing in one and the same direction.

3. The combination, with the frame, of the front rollers having centrally-bent blades, the bends of which all point in the same direction, and the rear rollers having like blades, the central bend of which point in the opposite direction to the bend of the front roller-blades.

4. In a clod-crusher and cultivator, the combination of the frame, the bent-blade rollers journaled in the frame, the shaft journaled on the frame, the plow-points secured to the shaft and connected together and to a suitable hand-lever for operating the plow-points, and the pawl and ratchet for controlling the movement of the shaft, substantially as and for the purpose set forth.

In witness whereof I hereunto set my hand in the presence of two witnesses.

ARTHUR J. AUCOIN.

Witnesses:
C. J. SEYENDRE,
L. I. TROSCLAIR.